Figure 4:
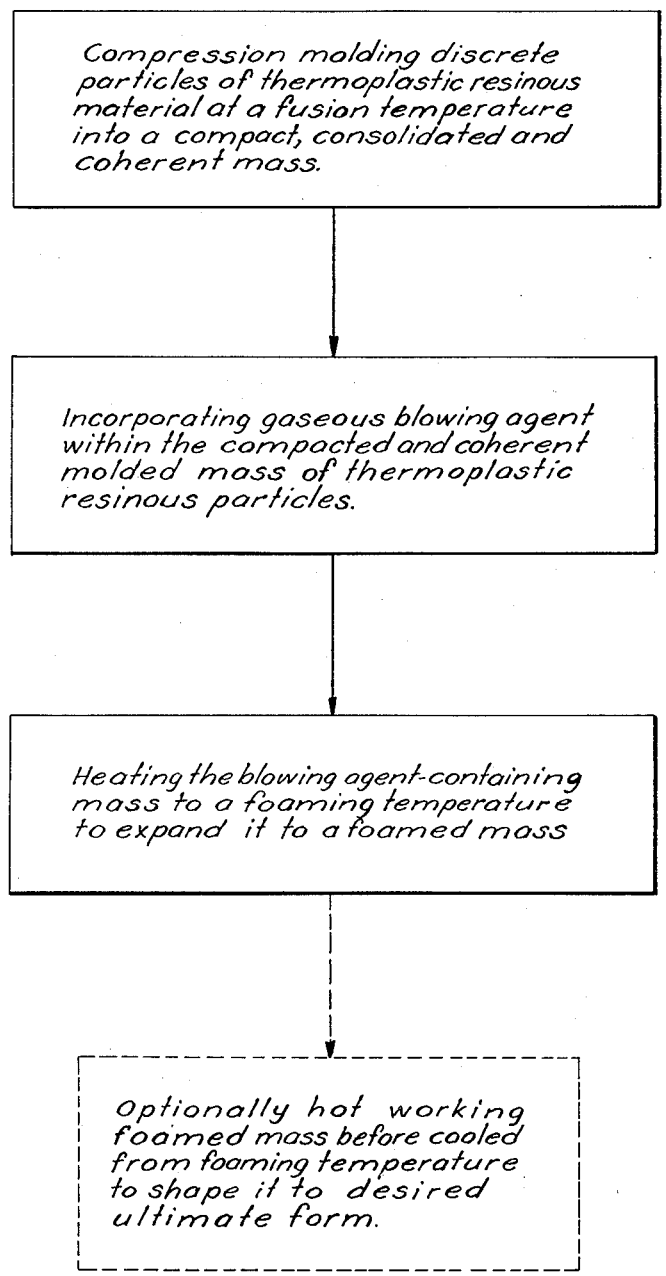

Sept. 18, 1962   J. D. GRIFFIN   3,054,146
METHOD FOR FORMING THERMOPLASTIC RESINOUS
MATERIALS INTO EXPANDED FOAM STRUCTURES
Filed Feb. 29, 1956   2 Sheets-Sheet 1

Expanded foam structure of thermoplastic resinous material having highly pronounced granular outlines & patterns on surface from compression molding granules at lower temperatures in range prior to expansion

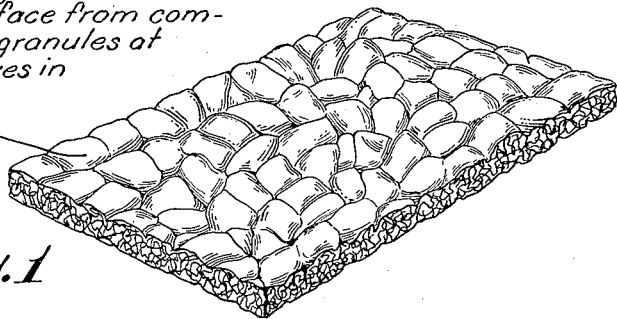

Fig. 1

Expanded foam structure of thermoplastic resinous material having moderately pronounced granular outlines & patterns on surface from compression molding granules at median temperatures in range prior to expansion

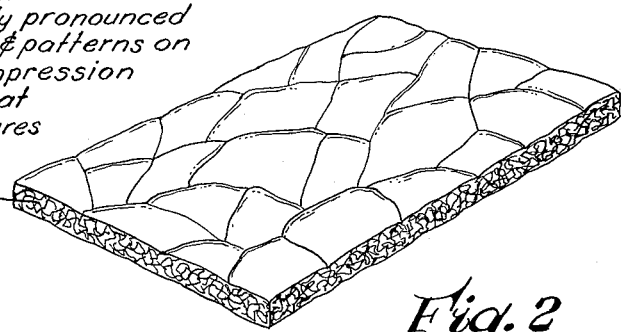

Fig. 2

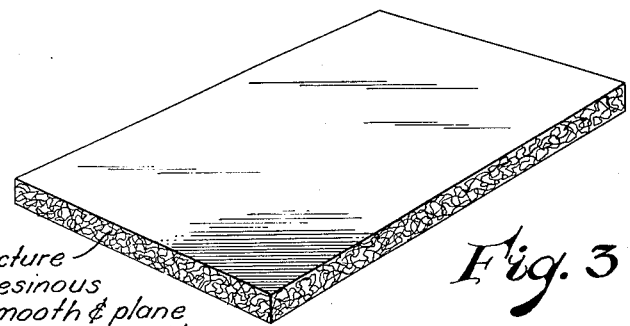

Expanded foam structure of thermoplastic resinous material having smooth & plane surface from compression molding granules at higher temperatures in range prior to expansion.

Fig. 3

INVENTOR.
John Dennis Griffin
BY
Griswold & Burdick
ATTORNEYS

INVENTOR.
John Dennis Griffin
BY
Griswold & Burdick
ATTORNEYS

United States Patent Office 3,054,146
Patented Sept. 18, 1962

3,054,146
METHOD FOR FORMING THERMOPLASTIC RESINOUS MATERIALS INTO EXPANDED FOAM STRUCTURES
John Dennis Griffin, Midland, Mich., assignor to The Dow Chemical Company, Midland, Mich., a corporation of Delaware
Filed Feb. 29, 1956, Ser. No. 568,627
12 Claims. (Cl. 18—48)

This invention relates to an improved method for forming thermoplastic resinous materials into expanded foam structures.

Pursuant to the known art, a variety of thermoplastic polymeric and resinous materials may be expanded to a porous, multicellular, solidified foam-like structure by the action of various propellants or agents for expanding or blowing the materials. The unexpanded material may be in the form of a thermoplastic gel and the like or it may be in the form of completely unexpanded or further expandable discrete particles such as granules, beads and similar forms. The blowing agents, in accordance with common practice, are usually gases, gas generating substances or highly fugacious liquids, which may or may not be solvents for the thermoplastic resinous material, that have been dissolved or otherwise intimately incorporated within the thermoplastic resinous material while it is in an unexpanded form. The presence or application of heat to an unfoamed thermoplastic material containing a blowing agent causes the blowing agent to be released or thermally expanded, or both, while the thermoplastic material is at or attaining a foaming temperature at which it is sufficiently softened and yieldable to permit the pressure of the thermally expanding blowing agent to expand it into the desired foam structure. In many cases the foaming may be accomplished by simultaneously releasing the blowing agent-containing material from a confining pressure while it is at or being heated to a foaming temperature.

Difficulty, however, is frequently experienced in controlling the surface which is obtained on an expanded foam structure. Usually some means must be employed for regulating the surface of a foam structure either during or after its formation. Thus, the thermoplastic resinous material may be expanded in confining mold forms which may be more or less successful for the purpose of securing desirable surface effects on the expanded foam structure. Or, in other instances, freely expanded structures may, subsequent to being cooled from a thermoplastic condition, be surface treated and shaped or patterned by further molding or physical hot working operations. Frequently the original surface of a freely expanded foam structure may be removed by abrading, sawing, cutting, shaving, planing or similar techniques to achieve a desirable plane and smooth surface.

It is among the principal objects of the present invention to provide an improved method for forming thermoplastic resinous materials into expanded foam structures having controlled and regulated surfaces which do not require subsequent operations and treatments in order to be placed in a suitable condition for use. Other objects and advantages of the invention will be apparent in the following description and specification.

According to the invention, a thermoplastic resinous material may advantageously be formed into an expanded foam structure by a method which comprises compression molding disecrete particles of the thermoplastic resinous material while they are at a fusing temperature into a coherent mass; incorporating within the coherent mass of compression molded discrete particles an adequate quantity of a gaseous blowing agent to expand said mass of thermoplastic resinous material to a foam structure when it is subjected to a sufficient quantity of heat to attain a foaming temperature within the mass to soften the mass and thermally expand the blowing agent; and subsequently heating the coherent, compression molded, blowing agent-containing mass of expandable thermoplastic resinous material to a foaming temperature to expand it to a foam structure. Advantageously the expandable mass is expanded to a volume at least about 3 times its original unexpanded volume as a compression molding.

If desired, the freshly expanded mass, before it has cooled from a thermoplastic condition, may be further fabricated by being hot worked in a mold or by other means such as by vacuum forming techniques or by calender rolls and the like to obtain a particular precise shape or outline. In such cases there is no necessity or requirement for the compression molded mass to be in the nature of a preform or to be shaped to anticipate or suggest the finally obtained configuration. The freshly expanded thermoplastic mass, if hot worked in a timely manner, is sufficiently pliable and readily shapeable to be thereby shaped into most forms and configurations. The optimum time for hot working a freshly expanded mass depends, of course, upon its relative volume and configuration and its individual cooling characteristics. As an example, however, most masses having a conventional and easily handleable size should be hot worked within not more than 20–30 seconds after their thermal expansion is completed and, preferably, within 1 or 2 seconds after this time.

As is perspectively illustrated in the figures of the accompanying drawing, the surface characteristics of the expanded foam articles formed in accordance with the method of the invention may be varied in a predetermining manner by using various sized discrete particles and different molding pressures and temperatures. Usually smaller particles combined with greater molding pressures and temperatures result in relatively smoother and more plane surfaces. On the other hand, larger particles and more moderate temperatures and pressures have less tendency to relieve the strains which may occur in the mass during molding. Such conditions thus tend to produce more irregular or grainy contours on the surface of the article expanded from the mass. The surface may often retain to a highly pronounced degree the expanded outline of the discrete particles in the mass and have embossed characteristics. The effect of hot working the freshly expanded, thermoplastic mass is usually to obtain a smoothed surface and a more dense foam structure although, if desired, surface effects and patterns may be achieved or augmented by the hot working operation.

The temperature of the compression molding step should be high enough to fuse the discrete particles of thermoplastic resinous material but not of sufficient magnitude to degrade, decompose or vaporize the thermoplastic resinous material. The compression molding should be performed in a manner and under such conditions as will effect a desired stress pattern in the molded mass so as to predetermine the ultimate surface in the finally expanded foam structure. By way of further explanation, compression moldings which have been prepared with a pressure which may be just about adequate to compact the fused mass into a coherent condition at a temperature just above or near to the fusion temperature of the thermoplastic resinous material usually permit a grainy or more highly pronounced particle-outline-retaining surface to be achieved on the foam structure. This is shown in FIGURES 1 and 2 of the drawing. The converse is usually true in that relatively greater compression at temperatures near the upper limit ordinarily predetermine and obtain a relatively smooth surface on the foam structure, as in FIGURE 3.

FIGURE 4 is a schematic representation of the present method illustrated in the manner of a flow sheet diagram to depict the process by which the described and illustrated articles may be provided.

A variety of gaseous blowing agents may be incorporated in the compression molded mass of thermoplastic resinous material. Any desired pressure, including atmospheric, may be utilized for this purpose. For expedience, it is usually advantageous to incorporate the gaseous blowing agent under pressure in order to reduce the time which may be required for the operation. Carbon dioxide may advantageously be employed although such materials as dichlorodifluoromethane and pentane or other low boiling hydrocarbons may also be employed suitably.

The amount of the blowing agent which is incorporated under given conditions of pressure, temperature and time depends, among other known factors, upon its molecular weight and thermal expanding characteristics as well as upon the thermoplastic properties of the particular thermoplastic resinous material that is involved. Usually, for example, an amount of carbon dioxide, based on the weight of the thermoplastic resinous material, between about 2 and 12 percent by weight may be a suitable and efficient amount for many thermoplastic resinous materials which are commonly employed for expanded foam structures. Likewise, between about 5 and 15 percent by weight of dichlorodifluoromethane is generally a suitable and efficient amount in many instances.

Ordinarily, the amount of a gaseous blowing agent which may be incorporated by pressurizing the compression molding with the blowing agent under pressures between about 200 and 2,000 pounds per square inch at temperatures near the freezing point of water for periods of time between about 16 and 36 hours will be found satisfactory. This, of course, may vary with particular blowing agents and thermoplastic resinous materials as well as with the size and shape of the compression molding involved. It will also vary as to the time requirement when greater or lesser pressures are involved or if the temperature is altered. When the impregnation of the blowing agent is accomplished under influence of pressure, it is usually advantageous to remove the compression molding from the pressurizing atmosphere after the blowing agent has been incorporated therein. This facilitates expanding the mass at lower foaming temperatures and precludes the practical difficulties that may be encountered when operating under pressure, especially if relatively high pressure is employed.

Any thermoplastic resinous material which can be expanded or foamed by conventional techniques may advantageously be formed into expanded foam structures in accordance with the method of the invention. Merely for purposes of convenient illustration, however, without intending to be restricted thereto, the invention is particularly adapted to be practiced with granules or beads of polystyrene, which may be in an essentially linear or in a cross-linked form, as being generally representative of expandable thermoplastic resinous materials and as being especially representative of alkenyl aromatic compounds which contain at least about 50 percent by weight of at least one alkenyl aromatic compound having the general formula Ar—CR=CH$_2$ wherein Ar is an aromatic radical and R is selected from the group consisting of a hydrogen atom and a methyl radical. Expandable, thermoplastic copolymers of styrene and polymers and copolymers of α-methyl styrene ar-methyl styrene or vinyltoluene, mono- and dichlorostyrene and ar-dimethyl styrene, including copolymers with such materials as vinylidene chloride and cross-linked copolymers containing small amounts of such materials as divinylbenzene may frequently be utilized with benefits commensurate with those which are derivable from employment of polystyrene.

Often this may also be the case with other expandable thermoplastic resinous materials including various copolymers of vinylidene chloride (which are frequently generically described as being sarans) and thermoplastic resinous materials which may be comprised of polymers and copolymers of methyl methacrylate, ethyl acrylate and other derivatives of acrylic acid, such as their homopolymers and copolymers of methyl methacrylate and vinylidene chloride, polymers and copolymers of vinyl acetate and vinyl butyral and the like; and various thermoplastic or thermoplastified derivatives of cellulose including cellulose nitrate and cellulose acetate. If desired, partially foamed or pre-expanded granules may be utilized for compression molding provided they retain some potential or capacibility for further expansion after addition or incorporation of a blowing agent while they are in the form of a coherent compression molded mass and upon subsequent attainment of a foaming temperature.

It is frequently advantageous for the discrete particles of thermoplastic resinous material which are compression molded to a coherent mass to be in the form of granules or beads having an average particle size between about 1 millimeter and ½ inch for their maximum dimensions. In many instances, however, relatively larger or smaller discrete particles may be employed just as satisfactorily and, as may be possible in some cases, even more desirably.

The compression molded masses, after incorporation of the blowing agent, may be subsequently expanded in any suitable manner. A sufficient quantity of heat should be employed to raise the temperature of the expandable mass of thermoplastic resinous material to a foaming temperature. Most expandable polystyrene and like materials, for example, require a temperature of at least about 185–190° F. for this purpose. Conversely, the application of excessive quantities of heat should be avoided to preclude overheating and thermally degrading or decomposing the expanded thermoplastic resinous material. Certain types of expandable polystyrene and like materials may be cause to collapse from a foam structure after they have been expanded when they are subjected to a temperature in the range from 275° F. to 400° F. They may even decompose at higher temperatures. The application of heat should only be for the required period to fully expand the mass, especially when relatively more heat sensitive thermoplastic resinous materials are involved. Usually the cross linked materials are less sensitive to extremes of temperature or prolonged exposures to higher temperatures and tend to produce foam structures having a greater thermal stability.

The heat energy which is provided for foaming the compression molded expandable mass of thermoplastic resinous material may be derived from conventional sources such as steam, hot air and other gases, heated liquid baths; or by heat from conductive heat-exchanging surfaces such as heated platens and the like; or radiant heat energy or heat from infra-red sources may be provided. If desired, dielectric or other forms of high frequency heating may also be employed for the purpose.

Further illustration of the invention is provided in and by the following examples wherein, unless otherwise indicated, all parts and percentages are to be taken by weight.

*Example I*

About 85 grams of granular polystyrene having an average particle size of about 1.4 millimeters was compression molded at a temperature of about 140° C. to a ⅛" x 6" x 6" sheet under a pressure of about 1,000 pounds per square inch. A 2" x 3" portion of this compression molded sheet was subjected to a carbon dioxide atmosphere under a pressure of about 500 pounds per square inch at a temperature in the neighborhood of 0° C. for a period of about 20 hours, after which the pressure was reduced and the molding removed. It was expanded to a foam structure by immersion for about a minute in an ethylene glycol bath which was maintained at a temperature of about 125° C. The foam structure obtained, after being removed from the heating bath and cooled, had dimensions of about ⅜" x 4¼" x 6½". The surface of the foam structure had a relatively tough and dense skin or outer layer which had a highly pronounced, raised pattern showing the expanded outlines of the original polystyrene granules. The foam structure was of good quality and had a uniform density of about 4½ pounds per cubic foot.

Similar foam structures were obtained by repeating the foregoing procedure excepting to vary the temperature of compression molding at various levels between the range from about 140 to 190° C. The surface characteristics obtained became increasingly smooth and less grainy, with less embossed effect, as the molding temperature was increased until, at a molding temperature of about 190° C., an expanded foam structure having an entirely smooth and plane surface was obtained on which there were no granular outlines or patterns discernible.

*Example II*

A ⅛" x 2" x 3" compression molding was obtained in a manner similar to that set forth in Example I using about 14 grams of the same polystyrene granules. Carbon dioxide was incorporated as the blowing agent in the compression molded granules according to the procedure set forth in the first example. The compression molding was expanded to a foam structure having dimensions of about ¼" x 5" x 7½" by immersion for about 45 seconds in an ethylene glycol bath at a temperature of about 125° C. After its expansion, the foam structure was immediately placed in a cold compression mold form having an elongate, boat-like central depression with about a 1" depth and rectangular dimensions of about 5" x 7½". The expanded foam structure was hot worked under manual pressure to a thinner configuration having a larger surface area which exactly duplicated that of the mold form. Within 10 seconds after completion of its expansion, the hot worked foam structure was cooled from a thermoplastic condition by immersion in a cold water bath. The after-molded foam structure had excellent characteristics as a molded article and an attractive surface appearance.

Analogous results may be obtained when the blowing agent is incorporated in the compression molded mass at pressures as low as atmospheric when suitable adjustment in the time and temperature conditions of incorporation is correspondingly made.

Articles which may be obtained by practice of the method of the invention may be used for various decorative and utilitarian purposes. Thus, articles with pronounced surface characteristics and definite embossment may be used, for example, as insulating panels having an integral decorative effect or they may be used for display purposes or for packaging and construction. Handles and other rough surfaces having good gripping characteristics may be prepared readily by the method of the invention. Articles which are further fabricated by hot working after expansion and before they are cooled from a thermoplastic condition may be formed into various shapes including flattened, high density foam sheets and the like or into angles, channels, curves, receptacles and containers and like objects. More complicated compression moldings may be prepared by hot working the freshly expanded mass by means of vacuum forming compression molding techniques. Or, if desired, sandwich construction panels or laminated composite structures may advantageously be obtained by bonding an integral layer or layers of various wood, metal, plastic, cloth and the like materials to the surface of the hot worked freshly expanded article before it has cooled from a thermoplastic condition.

Certain changes and modifications in the practice of the present invention can be readily entered into without departing substantially from its intended spirit and scope. Therefore, it is to be fully understood that the invention is not to be considered as being limited or in any way restricted by or to the preferred embodiments thereof which are included in the foregoing description and specification. Rather, it is to be interpreted and construed in the light of what is set forth and defined in the hereto appended claims.

What is claimed is:

1. Method for forming a thermoplastic resinous material into an expanded foam structure having controlled surface characteristics which comprises compression molding discrete particles of the thermoplastic resinous material while they are at a fusing temperature into a compacted, consolidated and coherent mass that is essentially free from voids while retaining therein the individual outlines and particulate characteristics of said discrete particles compression molded into said mass; incorporating within the compact and coherent, particle-outline-retaining mass of compression molded discrete particles an adequate quantity of a gaseous blowing agent to expand said mass to a foam structure when it is subjected to a sufficient quantity of heat to attain a foaming temperature within the mass to soften the mass and thermally expand the blowing agent, said blowing agent being incorporated in said mass by subjecting said compacted and consolidated mass to an atmosphere of said gaseous blowing agent until said quantity of the blowing agent has been impregnated in the mass; and subsequently subjecting the coherent, compression molded, blowing agent-containing mass of expandable thermoplastic resinous material to heat at a foaming temperature to expand it to a foam structure.

2. The method of claim 1 wherein the blowing agent is incorporated under a pressure between about 200 and 2,000 pounds per square inch.

3. The method of claim 1 wherein the blowing agent is carbon dioxide.

4. The method of claim 1 wherein the blowing agent is carbon dioxide incorporated in an amount between about 2 and 12 percent by weight.

5. The method of claim 1 wherein the blowing agent is dichlorodifluoromethane.

6. The method of claim 1 wherein the blowing agent is dichlorodifluoromethane incorporated in an amount between about 5 and 15 percent by weight.

7. The method of claim 1 wherein the thermoplastic resinous material comprises an alkenyl aromatic resinous material which contains in its composition at least about 50 percent by weight of at least one alkenyl aromatic compound having the general formula Ar—CR=CH$_2$ wherein Ar is an aromatic radical and R is selected from the group consisting of a hydrogen atom and a methyl radical.

8. The method of claim 1 wherein the thermoplastic resinous material comprises polystyrene.

9. The method of claim 1 wherein the thermoplastic resinous material comprises polyvinyltoluene.

10. The method of claim 1 wherein the coherent, compression molded, blowing agent-containing mass of expandable thermoplastic resinous material is volumetrically expanded at least about three times to a foam structure by being subjected to heat to a foaming temperature until said volumetric expansion has been accomplished.

11. The method of claim 1 and including, as a final step after expansion of the coherent, compression molded, blowing agent-containing mass to a foam structure, the step of hot working the freshly expanded foam structure by physically reforming to a desired ultimate configuration while it is still hot from said expansion and before it has cooled from a thermoplastic condition.

12. A method in accordance with the method set forth in claim 11 wherein the final hot working step is performed by compression molding techniques.

References Cited in the file of this patent

UNITED STATES PATENTS

| | | |
|---|---|---|
| 2,442,940 | Staudinger | June 8, 1948 |
| 2,531,665 | Booth | Nov. 28, 1950 |
| 2,532,242 | Ott | Nov. 28, 1950 |
| 2,532,243 | Ott | Nov. 28, 1950 |
| 2,714,747 | Lindemann et al. | Aug. 9, 1955 |
| 2,714,748 | Stirnemann et al. | Aug. 9, 1955 |